United States Patent
Misra et al.

(10) Patent No.: US 10,180,807 B2
(45) Date of Patent: Jan. 15, 2019

(54) METHOD AND SYSTEM FOR CONSOLIDATING A PLURALITY OF HETEROGENEOUS STORAGE SYSTEMS IN A DATA CENTER

(71) Applicant: Tata Consultancy Services Limited, Mumbai (IN)

(72) Inventors: Prateep Misra, Kolkata (IN); Soumitra Naskar, Kolkata (IN); Sumanta Ghosh, Kolkata (IN); Ankur Chakraborty, Kolkata (IN); Nilanjan Roy, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 67 days.

(21) Appl. No.: 14/345,934

(22) PCT Filed: Oct. 11, 2012

(86) PCT No.: PCT/IN2012/000677
§ 371 (c)(1),
(2) Date: Mar. 19, 2014

(87) PCT Pub. No.: WO2013/076736
PCT Pub. Date: May 30, 2013

(65) Prior Publication Data
US 2014/0325149 A1 Oct. 30, 2014

(30) Foreign Application Priority Data
Oct. 12, 2011 (IN) .......................... 2884/MUM/2011

(51) Int. Cl.
*G06F 12/00* (2006.01)
*G06F 3/06* (2006.01)

(52) U.S. Cl.
CPC .......... *G06F 3/0647* (2013.01); *G06F 3/0607* (2013.01); *G06F 3/067* (2013.01);
(Continued)

(58) Field of Classification Search
CPC .... G06F 3/0619; G06F 3/0626; G06F 3/0644; G06F 3/067; G06F 3/0689; G06F 3/0631; G06F 3/0647; G06F 3/0607; G06F 3/0685
See application file for complete search history.

(56) References Cited

U.S. PATENT DOCUMENTS 5,857,112 A * 1/1999 Hashemi ............. G06F 11/1096
710/8
7,159,093 B2 1/2007 Dalal et al.
(Continued)

FOREIGN PATENT DOCUMENTS

WO WO 2009/073013 A1 6/2009

OTHER PUBLICATIONS

Bill King Qlogic Corporation, "LUN Masking in a SAN" , Oct. 8, 2001, QLogic Communications, Inc, 12 pages.

*Primary Examiner* — Reginald G Bragdon
*Assistant Examiner* — Hannah A Faye-Joyner
(74) *Attorney, Agent, or Firm* — Finnegan, Henderson, Farabow, Garrett & Dunner LLP

(57) ABSTRACT

A system and method for consolidating a plurality of heterogeneous storage systems in a data center comprising collecting data from a plurality of heterogeneous storage devices using data collection tools, using Data Preparation Tool for extracting and translating the collected data, populating a Data Model stored in source storage configuration unit suitable for analysis, analyzing and classifying the collected data by an analysis unit based upon a plurality of attributes, comprising of a Consolidation Advisor that uses
(Continued)

the analyzed data and candidate Target System Configurations, Preferences & Constraints for generating optimum number, specification & configuration of the Consolidate Target State infrastructure and mappings of logical units from as-is data center storage infrastructure to the target state, and iteratively validating the same in a Validation task till the final desired consolidation and objectives are met.

13 Claims, 6 Drawing Sheets

(52) U.S. Cl.
CPC .......... *G06F 3/0619* (2013.01); *G06F 3/0626* (2013.01); *G06F 3/0631* (2013.01); *G06F 3/0644* (2013.01); *G06F 3/0685* (2013.01); *G06F 3/0689* (2013.01)

(56) References Cited

U.S. PATENT DOCUMENTS

| | | |
|---|---|---|
| 7,467,143 B2 | 12/2008 | Nojima |
| 7,640,342 B1 | 12/2009 | Aharoni et al. |
| 7,801,973 B1 * | 9/2010 | Thakur ................. G06F 3/0605 370/229 |
| 7,984,253 B1 | 7/2011 | Glade et al. |
| 7,987,330 B2 | 7/2011 | Dalton et al. |
| 8,140,812 B2 | 3/2012 | Arroyo et al. |
| 8,209,687 B2 | 6/2012 | Yuyitung et al. |
| 8,335,897 B2 | 12/2012 | Feldman et al. |
| 8,473,959 B2 | 6/2013 | Box et al. |
| 2007/0250829 A1 | 10/2007 | Hillier et al. |
| 2009/0083484 A1 * | 3/2009 | Basham ................. G06F 3/0605 711/114 |
| 2009/0177646 A1 | 7/2009 | Pham et al. |
| 2011/0010518 A1 | 1/2011 | Kavuri et al. |
| 2011/0209156 A1 * | 8/2011 | Box ...................... G06F 9/5077 718/104 |

\* cited by examiner

METHOD AND SYSTEM FOR CONSOLIDATING A PLURALITY OF HETEROGENEOUS STORAGE SYSTEMS IN A DATA CENTER

CROSS-REFERENCE TO RELATED PATENT APPLICATIONS

This application is a National Stage Entry of International Application No. PCT/IN2012/000677, filed Oct. 11, 2012, which claims priority from Indian Patent Application No. 2884/MUM/2011, filed Oct. 12, 2011. The entire contents of the above-referenced applications are expressly incorporated herein by reference.

FIELD OF THE INVENTION

The invention relates to a system and method for facilitating storage infrastructure consolidation. More particularly the invention relates to a method and system for providing processes, tools, best practices and recommendations for consolidating a plurality of heterogeneous storage systems in a data center.

BACKGROUND OF THE INVENTION

At present a large amount of data is accumulated by numerous organizations at all levels. Such data may be stored in a data storage facility or data center employing a large heterogeneous collection of storage devices such as Direct-attached storage (DAS), Network-attached storage (NAS), file servers, storage area network (SAN) attached storage arrays. The ever increasing amount of data imposes a problem in managing the data wherein the storage resources at hand may be utilized in an efficient manner.

Several tools are available for optimal configuration of individual storage devices or optimal configuration of Logical Unit Numbers (LUN) with respect to given device characteristics and workload. Automated Resource Provisioning Tools such as HP Minerva™, and the like for Large-Scale Storage Systems may facilitate automatically and optimally assigning workloads to a set of pre-selected storage arrays and preselected logical units in such arrays given the workload characteristics and array descriptions. However, such tools do not address the problem of consolidating multiple heterogeneous storage devices to a smaller set of storage devices in an optimal way considering a plurality of constraints such as capacity, performance, reliability, operational recovery, disaster recovery, and the like.

The prior art also describes various configuration advisor tools that may facilitate determining an adequate mix of storage devices to be installed for satisfying a given workload at a minimum cost. One example of such a configuration advisor tool is the EDT-CA tool developed at IBM Research and Florida International University. EDT-CA collects I/O characteristics data at level of storage volume extents (i.e. a fixed size portion of a logical volume) and aggregates this data over a plurality of time intervals and calculates the cost optimized mixes of disk types that may be employed by a customer to achieve required performance levels. However, such a solution is concerned with optimal configuration and layout in a single storage system and does not provide a method for overall data center storage consolidation. Moreover, the prior art also fails to describe a solution for data protection and recovery requirements in the target state.

The prior art also describes a plurality of automated planners for storage provisioning and disaster recovery. Such automated planners may comprise a Volume Planner. The Volume Planner takes the space and performance requirements such as I/O demand, read-write ratio, response time, and the like, of the new workload as input and recommends the number and sizes of the new volumes to be created as well as their locations. These are based on careful analysis of the current utilizations of the various subsystem components and their suitability to serve the new workload considering the hierarchical constraints and the space-performance imbalances among the pools and workloads.

Hence, the solutions provided by the prior arts are more concerned with optimal configuration and layout in a single storage system or an optimal assignment of workloads to predefined layouts in a given storage system. Moreover, the prior art does not consider the case wherein multiple workloads running on multiple heterogeneous storage devices/systems in the data center are optimally consolidated to a smaller set of storage devices. Further, the prior art is concerned with Input/output and capacity needs alone and do not address to problems related to data protection and recovery requirements.

In order to solve the above mentioned problems, the present application proposes a system and an underlying method for consolidating a data center containing a plurality of heterogeneous storage devices to a smaller set of refreshed storage systems.

Other features and advantages of the present invention will be explained in the following description of the application having reference to the appended drawings.

OBJECTIVES OF THE INVENTION

It is a primary objective of the present application to provide, a system and a related method for consolidation of a large heterogeneous collection of storage systems such as Direct-attached storage (DAS), Network-attached storage (NAS), file servers, Storage area network (SAN) attached storage arrays in a data center to a much smaller number of refreshed storage systems.

It is another objective of the application to optimally consolidate the storage systems of entire data center and to reduce storage administration and operational expenditure while ensuring equal or better quality of service (service level objectives) in the consolidated target state than offered by the legacy/present data center. The service level objectives may include capacity, random IOPS and sequential access bandwidth requirements as well as data protection, operational recovery and disaster recovery requirements.

It is one of the objectives of the present application to provide improved storage utilization by better resource pooling and sharing, post consolidation.

Yet another objective of the present application is to improve the availability of storage systems and maintain a better uptime by providing better data protection capabilities available in the target refreshed consolidated storage system and elimination of multiple storage islands.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention proposes a system and method for consolidating a plurality of heterogeneous storage systems in a data center. The method described herein takes a comprehensive view of a plurality of heterogeneous storage systems present in the entire data center and is focused towards optimal consolidation. Further, the consolidation is done in such a way that the storage administration and operational costs incurred are reduced while ensuring that the service level objectives are met or exceeded in the consolidated target storage state in comparison to the data center in legacy/present state. The service level objectives may include objectives such as capacity, random IOPS, bandwidth requirement, and the like. In an aspect the method provided herein may as well ensure data protection, operational recovery and disaster recovery in the consolidated storage state.

In embodiment, a computer implemented method for consolidating a plurality of heterogeneous storage systems in a data center into a target storage system is provided. In an aspect, the target storage system comprises of a smaller number of refreshed storage systems than in the data center at present. The computer implemented method comprises collecting a first set of parameters relating to the plurality of heterogeneous storage systems by executing one or more data collection tools. The first set of parameters are parsed and validated by a data preparation tool. In an aspect, the first set of parameters relating to the heterogeneous storage systems include but limited to storage performance statistics dump, logs, Comma Separated Values (CSV) files, manually populated storage data template spread-sheet, and the like. Thereupon, a data model is created in a source configuration unit by the data preparation tool. Such a data model is populated with the first set of parameters. In an aspect, the data model created by the data preparation tool may be an object hierarchy built in volatile memory or optionally a set of persistent CSV files. In an aspect, the data model stored in the source configuration unit may include elements and attributes of storage elements, storage area networks, backup and archival strategy, application workload, storage virtualization, host volumes and data stores. The first set of parameters from the data model is then analyzed in multiple dimensions by an analysis unit. Based on the analysis of the first set of parameters the heterogeneous storage systems are classified. In an aspect, the classification of the plurality of heterogeneous storage systems may be based on access pattern, usage pattern, utilization of data stored in the heterogeneous storage systems. The classification of the heterogeneous storage systems along with a second set of parameters relating to the target storage system are then inputted into a consolidation advisor. The second set of data may be stored in a target storage configuration unit. In an embodiment, the second set of parameters regarding the target storage state include but not limited to type of storage element, number of disks in RAID group, capacity of individual disks, maximum allowed capacity of storage pool, annual projected growth rate of storage capacity, number of spare disks and specific preferences and constraints regarding the target storage system, and the like. The consolidation advisor upon receiving the input, maps a plurality of logical units of the heterogeneous storage system in corresponding logical units of the target storage system based on the classification of the heterogeneous storage systems and the second set of parameters.

Further, the data stored in the heterogeneous storage systems may be migrated to the target storage system based on the mapping of logical units of the heterogeneous storage systems in corresponding logical units of the target storage system. Moreover, an exception report may be generated in case a logical unit of the heterogeneous storage systems cannot be mapped to any logical unit in the target storage system.

In an embodiment, a system for consolidating a plurality of heterogeneous storage systems in a data center is provided. In an aspect, the source heterogeneous storage systems may include a plurality of heterogeneous collection of Direct-attached storage, Network-attached storage, file servers, and storage area network attached storage arrays. Such a system for consolidation may include one or more data collection tools for collecting a first set of parameters relating to the heterogeneous storage systems, a data preparation tool for transforming the first set of parameters into log files and for populating a Data Model, a source storage configuration unit for storing the data model, an analysis unit for analyzing, classifying and clustering the heterogeneous storage systems based on the collected first set of parameters; a target storage configuration system for storing a second set of parameters related to a target storage system and a consolidation advisor that accepts the data related to classification and clustering of the heterogeneous storage systems. In an embodiment, the consolidation advisor creates storage pools for target storage system using logical units from the heterogeneous storage systems wherein the logical units belong to individual storage resource classes. Further, the consolidation advisor may identify replication requirement of target system. The consolidation advisor packs the logical units from each storage pool of target storage system into one or more RAID groups in such a way that cumulative I/O and capacity dimensions of logical units are met for each RAID group. Further, the consolidation advisor assigns the RAID groups to one or more storage arrays in such a way that I/O and capacity constraints are met. In an embodiment, the consolidation advisor may calculate return on investment of the target storage system. Such return on investment calculation may comprise of modeling and calculating capital expenditure, operation expenditure, labor cost, business impact cost for source and target systems. In an aspect, the one or more data collection tools may comprises of Enterprise System Management (ESM) & monitoring tools, Storage Resource management (SRM) tools, Storage system management and monitoring consoles, I/O and Resource Monitoring tools that may be available as part of server operating system, Server Virtualization management consoles, Application dependency discovery tool, and the like. In an aspect, data may additionally be collected manually. In another aspect, the data preparation tool may be an extendable plug-in based framework supporting plurality of storage vendors.

It is to be noted that the system and method described above merely provide an outline of the present invention and the same may include various other components and method steps.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the present document example constructions of the invention; however, the invention is not limited to the specific methods and apparatus disclosed in the document and the drawing.

DETAILED DESCRIPTION OF THE INVENTION

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiment is merely exemplary of the invention, which may be embodied in various forms. The scope of the invention is not restricted to the listed embodiments and is limited only by the appended claims.

In the following description the terms "as-is state" and "source state" interchangeably shall mean the present data center storage infrastructure state that needs to be transformed.

Further, the terms "target state" and "to-be state" interchangeably shall mean the data center storage infrastructure state that is desired to be achieved.

The disclosed embodiments are merely exemplary of the invention, which may be embodied in various forms.

Figure 1:
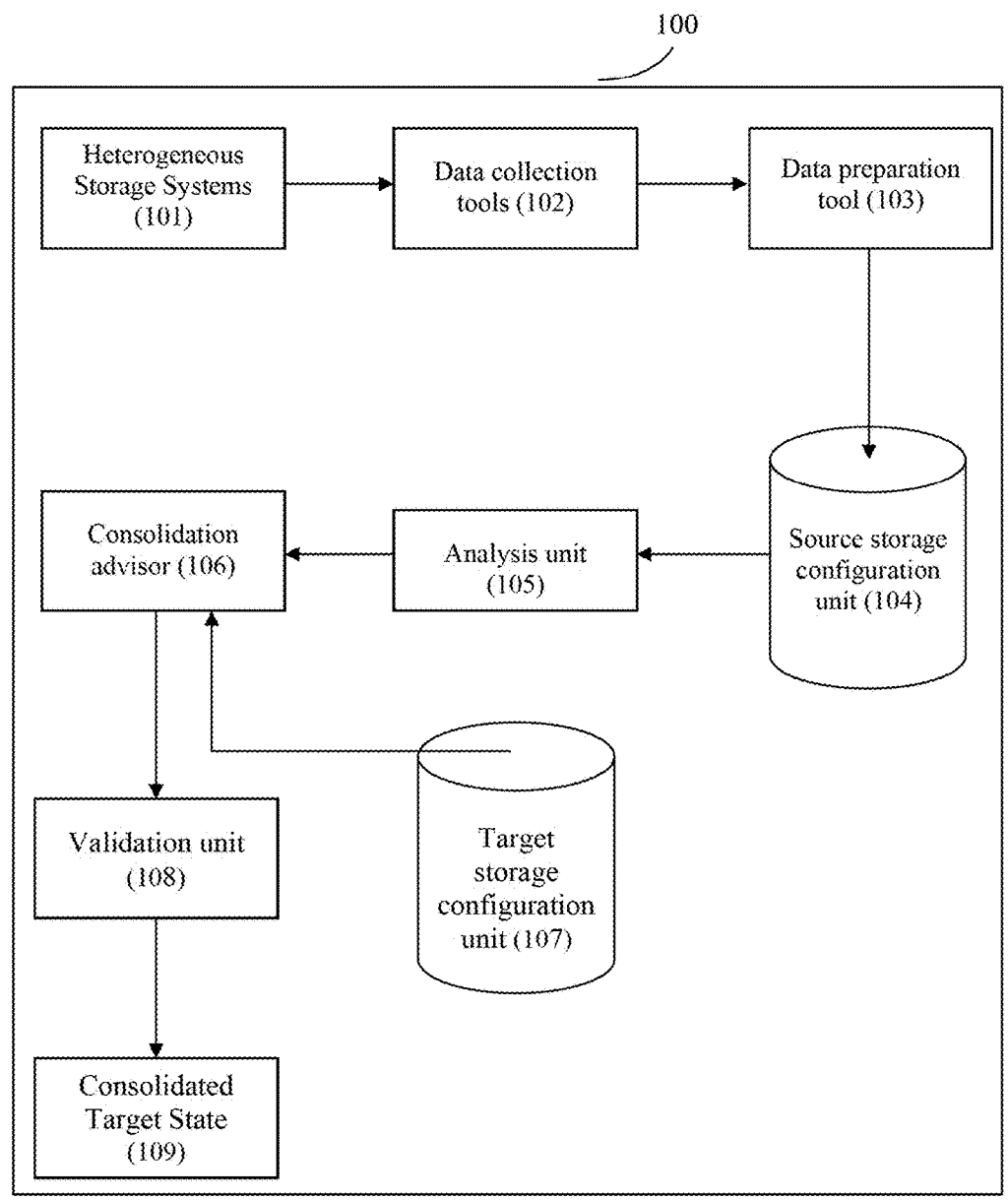
FIG. 1 illustrates an exemplary data center storage consolidation system.

FIG. 1 illustrates a data center storage consolidation system (100) also referred to as storage infrastructure consolidation system that may be utilized for analyzing and generating recommendations for consolidation of raw data stored in a plurality of heterogeneous storage systems (101) such as data storage systems, disk arrays, Direct-attached storage (DAS), Network-attached storage (NAS), existing application servers, storage area network (SAN) and the like. The plurality of heterogeneous storage systems (101) constitute a data center that is in "as-is state" or "source state". Such an "as-is state" may not be a desirable state as far as the cost effectiveness is concerned. Raw configuration and workload data is collected from the plurality of heterogeneous storage systems (101) in a structured manner. In an aspect the raw data may be captured from a variety of sources including but not limited to Application inventory, Server, Storage and SAN Switching Inventory, Data Center Network diagrams, Configuration management database (CMDB) data, Backup and Disaster Recovery plans, Business Continuity Plans, Regulatory and Compliance requirements, and the like. The raw data collection is executed by employing a plurality of data collection tools (102) including but not limited to Enterprise System Management (ESM) & Monitoring Tools, Storage Resource Management (SRM) tools, Storage system management and monitoring consoles, I/O and Resource Monitoring tools that may be available as part of server operating system, Server Virtualization management consoles, Application dependency discovery tools, and the like. Such a raw data may be related to information regarding one or more data centers, Information about data center wise applications and their workload characteristics; characteristics, utilization and financial information about various Storage Elements; Information regarding storage network elements and storage network configuration; Information about host server and host volumes and Logical units (LUNs); Information regarding storage configuration in terms of Logical unit/Logical unit number, pool, array; Performance statistics for storage array, applications and host volumes. Additionally, data may be collected manually. In aspect, the information regarding a plurality of Data Stores, applications that own and access the data contained in a particular Data Store, and policies for managing the Data Store. Data Stores may be logical containers of data corresponding to an entity or business process For example, Employee Payroll, Customer Data, Email Archives, and the like. Data resources in a Data Store may be classified via a data classification process and assigned a specific information management policy. Such collected raw data is then utilized for further analysis, transformation and migration planning. The collected raw data is then utilized by a data preparation tool (103) that populates a data model stored in a source storage configuration unit (104) with the raw data. In an aspect, the collected data may be used to populate pre-created spreadsheet templates stored in the source storage configuration unit (104). In another related aspect, the data model of the source storage configuration unit (104) storing the collected raw data may be reviewed by stakeholders for correctness and completeness. Once the collected data has been reviewed, certain missing elements may be added.

The data in the Data Model stored in the source storage configuration unit (104) are then analyzed using multi-dimensional analysis by an Analysis Unit (105). The main objective of analysis is to get visibility of various aspects of storage usage in the as-is state and identify opportunities for consolidation and improvement of utilization. The Analysis Unit (105) classifies the plurality of data resources and corresponding storage needs based on the usage environment. For example, the data resources may be classified on the basis of Production, Staging, QA, Test, Development, and the like.

Further, all the data resources and their corresponding storage needs may be classified into distinct classes based on a plurality of attributes such as performance, availability, operational recovery, disaster recovery and retention and regulatory requirements. An aggregation of allocated capacity for different storage resource classes is done. Further, a classification is done on criticality of the application accessing the storage resource. The data is also classified with respect to storage tier and aggregate capacity per tier is computed.

Figure 3:
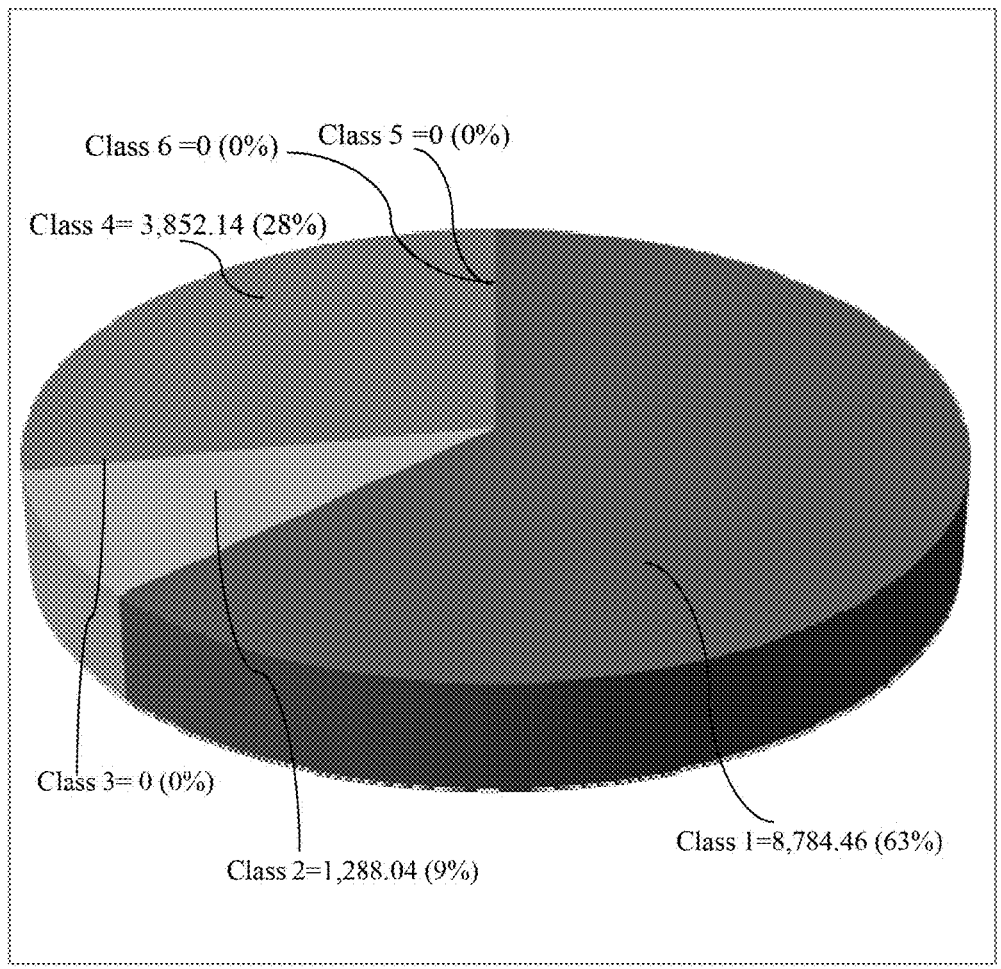
FIG. 3 illustrates an example of the capacity Analysis with respect to different storage resource classes.

FIG. 3 illustrates the capacity Analysis with respect to different storage resource classes. The allocated storage space may be classified under a plurality of storage resource classes that may occupy a percentage of total allocated storage capacity in the data center. For example, the allocated storage space may be classified as class 1 having 63%, class 2 having 9%, class 4 having 28%, and classes 3, 5 and 6 having 0% of the total allocated storage capacity.

Figure 4:
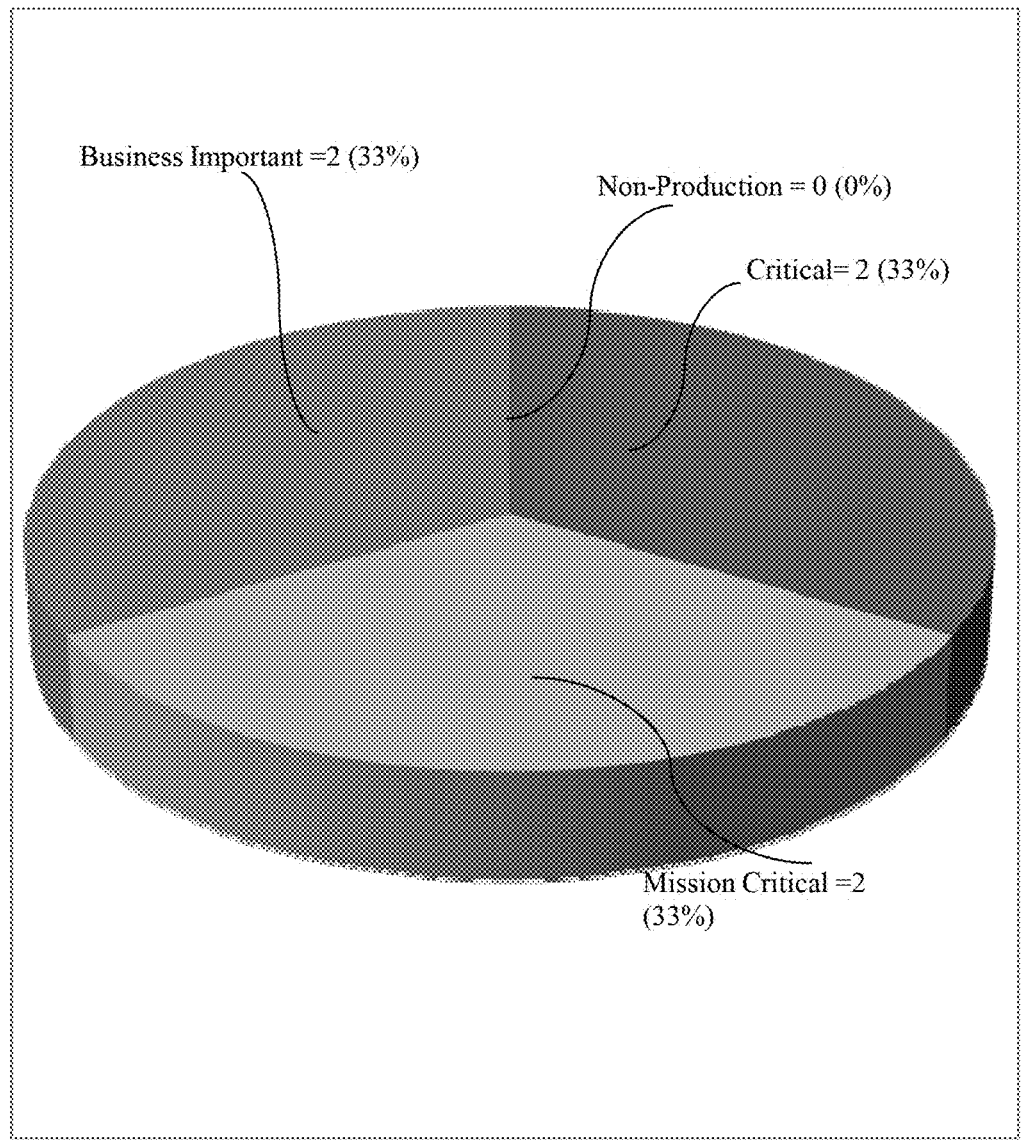
FIG. 4 illustrates an example of the Class of service wise application distribution.

FIG. 4 illustrates an example of the class of service based application distribution. The applications using various storage resources may be classified based on the criticality of the applications. For example, the applications may be classified as Non-production, Business important, critical and mission critical, and the like.

Table 1 illustrates an example of the Business criticality based analysis of the storage arrays.

| Storage Array | Critical Application | Mission Critical Application | Business Important Application | Non-Production Application |
|---|---|---|---|---|
| ARRAY 01 | 0 | 1 | 2 | 0 |
| ARRAY 02 | 2 | 1 | 0 | 0 |
| ARRAY 03 | 0 | 0 | 0 | 0 |
| ARRAY 04 | 0 | 0 | 0 | 0 |

Figure 5:
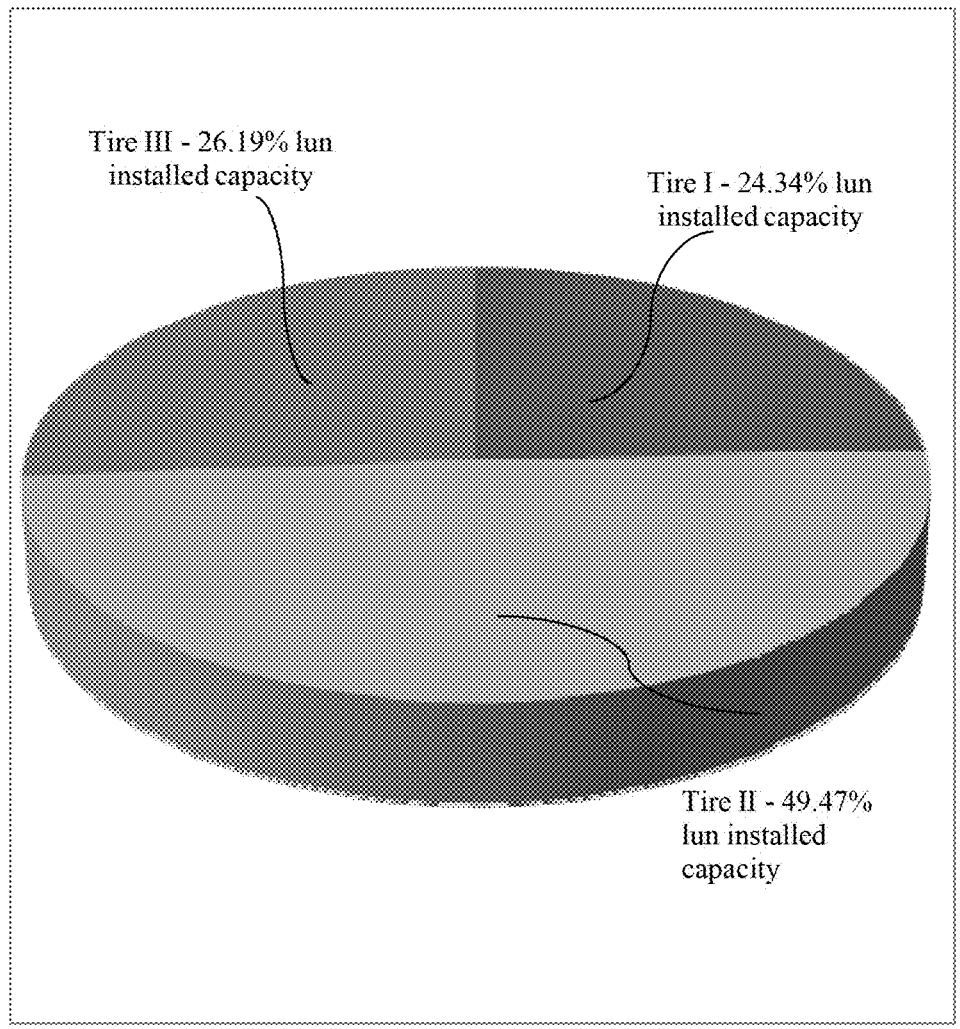
FIG. 5 illustrates an example of the Storage Tier distribution and installed capacity.

FIG. 5 illustrates an example of the Storage Tier distribution and installed capacity. The storage disks may be classified into a plurality of Tiers based on the capacity of logical units in the storage disk.

Table 2 illustrates an example of the Environment based analysis.

| Environment | Critical Application | Mission Critical Application | Business Important Application | Non-Production Application |
|---|---|---|---|---|
| Non-Production | 3 | 0 | 106 | 97 |
| Production | 355 | 29 | 23 | 0 |
| QA | 0 | 19 | 16 | 0 |

Figure 6:
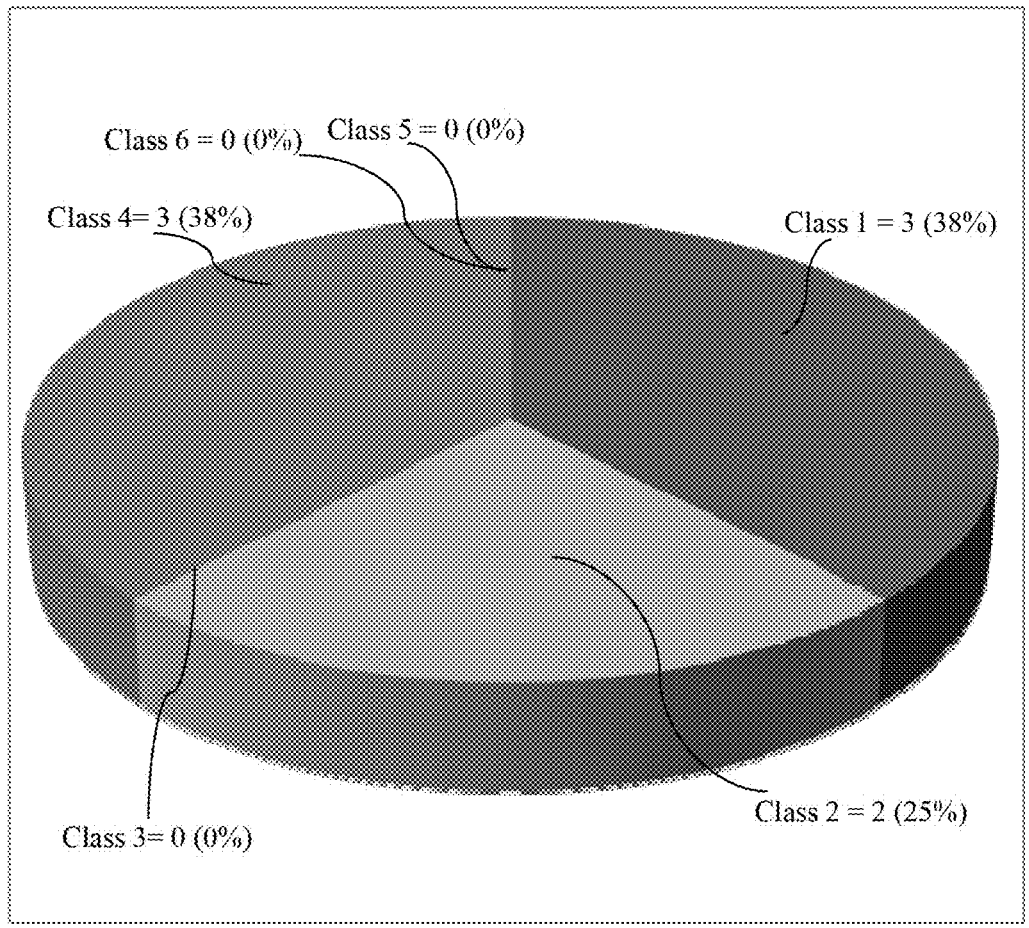
FIG. 6 illustrates an example of the Storage resource class distribution.

FIG. 6 illustrates an example of the Storage resource class distribution.

Mapping for all replications is done. Listing of software licenses owned by the storage resources is done. Each such class of data resource expects a minimum service level with respect to performance, availability, operational and disaster recovery. The storage resource requirements for each class of data resource identified above is then aggregated. Thereupon, the data resources are analyzed based on access/usage patterns and content. The data resources are also analyzed based on actual utilization level. Moreover, hot spots and cool spots are also identified. The output of such an analysis is then used as an input by a Consolidation Advisor (106) for the transformation planning phase.

One of the main tasks of the Analysis Unit is to classify each Logical unit (LUN) of the as-is state to a particular Storage Service Class (SSC). Each Storage Service Class signifies a certain category of service levels available to the logical unit from the underlying hardware and configuration. The type of disk used, the RAID level and the level of Operational Recovery (OR) and Disaster recovery (DR) are the main dimensions against which the SSC of each logical unit is decided.

Consolidation Advisor (106) utilizes the output from the analysis unit (105) to do an evaluation and recommendation of the to-be state. An important input to the Consolidation Advisor is the Target State Configuration, Constraints & Preferences stored in the target storage configuration unit (107). The target storage configuration unit (107) contains possible configurations of candidate storage arrays of the target state. Candidate storage arrays are described in terms of their resources such as number and type of front end ports, cache, processor capacity, number and bandwidth of backend ports, number of backend buses, number and type of disks. Additionally, target storage configuration unit (107) may also contain any preferences and constraints that may apply in the target state. The possible configuration options, preferences and constraints may limit the ability to provision and consolidate the as-is state to the desired target state.

The output of the Consolidation Advisor (106) is a set of Storage Pools where each Storage Pool is comprised of a number of RAID sets. Each Storage Pool is given a unique identity. Storage Pools are created on exactly one of the storage arrays in the to-be state. The Consolidation Advisor specifies the number, make & configuration of the storage arrays in the to-be state. The Consolidation Advisor also outputs the composition of each RAID set in terms of the number and type of disks that constitute the RAID group and the type of RAID configuration. Finally the consolidation advisor produces a mapping or assignment of the logical units from the as-is state to the identified Storage Pool.

In an embodiment, the number, make, model and detailed specification of the refreshed hardware in the target state may already be decided and fixed and is available as part of the Target State Configuration, Constraints & Preference from target storage configuration unit (107). In such a case the scope of transformation planning is limited to creation of optimal storage pools comprising of one or more RAID sets, deciding the optimal configuration of RAID sets, identifying the type and number of disks in each RAID sets and assignments of logical units from the as-is state to the appropriate storage pools in the to-be state. Total available storage capacity for logical units corresponding to each storage service class is limited by the number of storage systems, their configuration and system specific constraints as specified in the "Known/Fixed End State". Since the target state is fixed, it is possible that enough capacity or bandwidth is not available to accommodate a given SSC. In such a case the Consolidation Advisor may generate at least one exception reports indicating that mappings are not feasible with the given target state. The user has the option of modifying the target state configuration and retrying.

The Consolidation Advisor uses an iterative approach to generate the mappings of the logical units from the as-is state to the target state. The Consolidation Advisor retains the disk type and RAID configuration of each logical unit in the target state unchanged from that in the as-is state. For each logical unit, the required capacity (preferably in GB) and the maximum random IOPS required/observed are the two main data points required by the Consolidation Advisor. These values are available in the Data Model stored in the source storage configuration unit (105).

Figure 2:
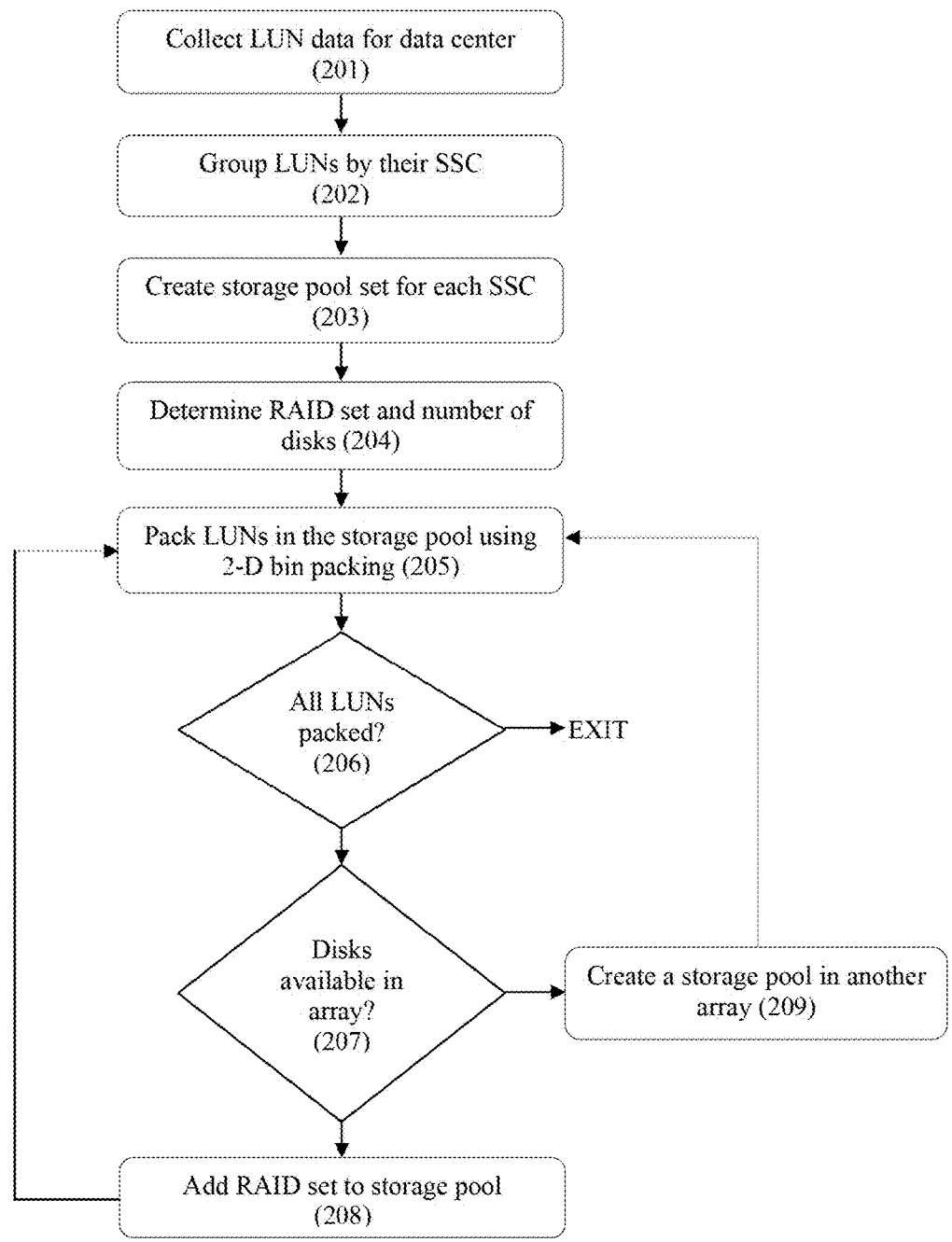
FIG. 2 illustrates the method for generating the mappings of the logical units from the as-is state to the target state.

FIG. 2 illustrates the method for generating the mappings of the logical units from the as-is state to the target state. The data related to a plurality of logical units in the as-is state is collected (201). Thereupon, the logical units of the as-is state are grouped (202) in accordance with their respective storage service class. Corresponding to each storage service class having identical disk type and RAID configuration, a "Storage Pool Set" is created and all the logical units of said storage service class are mapped to a unique "Storage Pool Set" (203). Further, the "storage pool sets" are individually processed. A Storage Pool is created with exactly one Raid set in one of the target state storage array. The Raid type is dictated by the Storage Service Class. The number of disks in the Raid set is decided as per best practices of the target storage device (204). Total storage capacity and IOPS that are possible in the Storage Pool depends on the number of Raid sets in the pool. A 2-Dimensional Bin Packing algorithm is used pack Logical units in the Storage Pool. The two dimensions in question are capacity and IOPS (205). In case all the logical units could not be packed (206), the Storage Pool is augmented by another Raid set and the packing is executed again (208). In case enough disks are not available in one array to augment the Storage Pool (207), a Storage Pool is created in another array of the target state (209). A Logical unit in the "Storage Pool Set" that requires a local replica; a replica is packed in a different Storage Pool. If required additional Storage Pools are created for this purpose. Each logical unit in a "Storage Pool Set" that requires a remote replica; a replica is packed in a different Storage Pool in another data center. If required additional Storage Pools are created in a different data center for this purpose. This process is repeated for every "Storage Pool Set" created by the Consolidation Advisor (106).

The output of the Consolidation Advisor (106) is checked by the Validation unit (108). In case of any physical limitations of the fixed infrastructure and constraints it is not possible to map/assign all the as-is state logical units to the target state, one or more exception reports may be generated. Reports may be generated to list out all logical units that could not be mapped. In an aspect, the Consolidation Advisor (106) may enable either increasing resources in the target state or retaining some hardware from the as-is state. The Consolidation Advisor (106) may also enable re-iterating by changing the chosen target state storage array or changing storage pool design parameters. The final output Consolidated Target State (109) is the final selected list of storage arrays, their specification, configuration details and the logical unit mappings. In an aspect, the data stored in the heterogeneous storage systems (101) may be migrated to the consolidated target storage state according to the Consolidated Target State (109) using a migration tool. In aspect, the migration tool may be a commercially available migration tool such as rsync, Host-based volume managers, and the like.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived there from, such that structural and logical substitutions and changes may be made without departing from the scope of this disclosure. Figures are also merely representational and may not be drawn to scale.

Certain proportions thereof may be exaggerated, while others may be minimized. Accordingly, the specification and drawings are to be regarded in an illustrative rather than a restrictive sense.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A computer implemented method for consolidating a plurality of heterogeneous storage systems in a data center, the method comprising:
   collecting a first set of parameters relating to the plurality of heterogeneous storage systems;
   parsing and validating, by one or more hardware processors, the first set of parameters;
   creating and populating, by the one or more hardware processors, a data model with the first set of parameters;
   analyzing, by the one or more hardware processors, the collected first set of parameters from the data model in multiple dimensions, to classify a plurality of logical units of the plurality of heterogeneous storage systems to distinct Storage Service Classes, wherein the multiple dimensions include a type of disk used, a RAID level, a level of Operational Recovery and a level of Disaster Recovery, performance, availability, retention and regulatory requirements, usage environment, criticality of the application accessing the logical units, storage tier, aggregate capacity per tier and service level objectives;
   iteratively mapping, by the one or more hardware processors, the plurality of logical units of the plurality of heterogeneous storage system in corresponding logical units of the target state based on the classification of the plurality of heterogeneous storage systems and a second set of parameters corresponding to a target storage system till a desired service level is achieved in the target storage system, wherein iteratively mapping the plurality of logical units, comprises:
  a. creating storage pools for the target storage system using logical units from the plurality of heterogeneous storage systems, wherein the logical units belong to individual storage resource classes;
  b. replicating the logical units requiring at least one of local and remote replicas in the storage pools;
  c. packing the logical units and the at least one of local and remote replicas from each storage pool of the target storage system into one or more RAID groups using 2-dimensional bin packing technique such that the maximum random Input / Output operations per second IOPS required and capacity dimensions of the logical units are met for each of the one or more RAID groups; and
  d. iteratively assigns each of the one or more RAID groups to one or more storage arrays;
generating an exception report when a logical unit of the plurality of heterogeneous storage systems cannot be mapped to any logical unit in the target storage system; and
dynamically updating values of the second set of parameters based on the generated exception report and repeating the step of iteratively mapping the plurality of logical units of the plurality of heterogeneous storage system.

2. The method as claimed in claim 1, further comprising, migrating the data stored in the plurality of heterogeneous storage systems to the target storage system based on the mapping of the heterogeneous storage systems in one or more storage service classes of the target storage system.

3. The method as claimed in claim 1, wherein the first set of parameters relating to the heterogeneous storage systems comprises storage performance statistics dump, logs, Comma Separated Values (CSV) files and manually populated storage data template spread-sheet.

4. The method as claimed in claim 1, wherein the data model is an object hierarchy built in volatile memory or a set of persistent CSV files.

5. The method as claimed in claim 4, wherein the data model comprises elements and attributes of storage elements, storage area networks, backup and archival strategy, application workload, storage virtualization, host volumes and data stores.

6. The method as claimed in claim 1, wherein the second set of parameters regarding the target storage system comprises type of storage element, number of disks in RAID group, capacity of individual disks, maximum allowed capacity of storage pool, annual projected growth rate of storage capacity, number of spare disks and specific preferences and constraints regarding the target state.

7. The method as claimed in claim 1, wherein the analysis and classification of the plurality of heterogeneous storage systems is based on access pattern, usage pattern, and utilization of data stored in the plurality of heterogeneous storage systems.

8. A system for consolidating a plurality of heterogeneous storage systems in a data center, said system comprising:
  one or more data collection tools, executing on one or more hardware processors, for collecting a first set of parameters relating to the plurality of heterogeneous storage systems;
  a data preparation tool, executing on the one or more hardware processors, for transforming the first set of parameters into log files and for populating a data model; a source storage configuration unit, executing on the one or more hardware processors, for storing the data model;
  an analysis unit, executing on the one or more hardware processors, for analyzing and classifying the plurality of heterogeneous storage systems based on the collected first set of parameters in multiple dimensions, wherein each of a plurality of logical units of the plurality of heterogeneous storage systems are classified to distinct Storage Service Classes, wherein the multiple dimensions include a type of disk used, a RAID level, a level of Operational Recovery and a level of Disaster Recovery, performance, availability, retention and regulatory requirements, usage environment, criticality of the application accessing the logical units, storage tier, aggregate capacity per tier and service level objectives;
  a target storage configuration system, executing on the one or more hardware processors, for storing a second set of parameters related to a target storage system; and
  a consolidation advisor, executing on the one or more hardware processors, wherein the consolidation advisor:
  a. creates storage pools for the target storage system using logical units from the plurality of heterogeneous storage systems wherein the logical units belong to individual storage resource classes;
  b. replicates the logical units requiring at least one of local and remote replicas in the storage pools;
  c. packs the logical units and the at least one of local and remote replicas from each storage pool of the target storage system into one or more RAID groups using 2-dimensional bin packing technique such that the maximum random Input / Output operations per second IOPS required and capacity dimensions of the logical units are met for each of the one or more RAID groups;
  d. iteratively assigns each of the one or more RAID groups to one or more storage arrays;
  e. generates an exception report when a logical unit of the plurality of heterogeneous storage systems cannot be mapped to any logical unit in the target storage system; and
  f. dynamically updates values of the second set of parameters based on the generated exception report and repeating the steps of (a)-(d).

9. The system as claimed in claim 8, wherein the consolidation advisor calculates return on investment of the target storage system.

10. The system as claimed in claim 9, wherein the return on investment calculation comprises modeling and calculating capital expenditure, operation expenditure, labor cost, and business impact cost for source and target systems.

11. The system as claimed in claim 8, wherein the plurality of heterogeneous storage systems include a plurality of heterogeneous collection of direct-attached storage, network-attached storage, file servers, and storage area network attached storage arrays.

12. The system as claimed in claim 8, wherein the one or more data collection tools comprise enterprise system management (ESM) & monitoring tools, storage resource management (SRM) tools, storage system management and monitoring consoles, I/O and resource monitoring tools included in a server operating system, server virtualization management consoles, and application dependency discovery tool.

13. The system as claimed in claim 8, wherein the data preparation tool (is an extendable plug-in based framework supporting a plurality of storage vendors.

\* \* \* \* \*